United States Patent

Martin

Patent Number: 5,613,008
Date of Patent: Mar. 18, 1997

[54] HEARING AID

[75] Inventor: Raimund Martin, Eggolsheim, Germany

[73] Assignee: Siemens Audiologische Technik GmbH, Erlangen, Germany

[21] Appl. No.: 302,246

[22] Filed: Sep. 8, 1994

Related U.S. Application Data

[63] Continuation of Ser. No. 77,669, Jun. 17, 1993, abandoned.

[30] Foreign Application Priority Data

Jun. 29, 1992 [DE] Germany ............................ 92111014.4

[51] Int. Cl.$^6$ .................................................. H04K 25/00
[52] U.S. Cl. ............................ 381/68.2; 381/68; 381/68.4
[58] Field of Search ........................... 381/68, 68.2, 68.4, 381/23.1, 31

[56] References Cited

U.S. PATENT DOCUMENTS

| | | | |
|---|---|---|---|
| 4,187,413 | 2/1980 | Moser | 179/107 |
| 4,592,087 | 5/1986 | Killion | 381/68 |
| 4,689,819 | 8/1987 | Killion | 381/68 |
| 5,055,708 | 10/1991 | Sugawara | 307/270 |

FOREIGN PATENT DOCUMENTS

| | | | |
|---|---|---|---|
| 0483702A2 | 10/1991 | European Pat. Off. | H03G 7/00 |
| 2716336 | 7/1978 | Germany | H04R 25/00 |
| 3616752C2 | 8/1988 | Germany | H03F 3/217 |
| 3917432A1 | 12/1990 | Germany | H04L 25/40 |

*Primary Examiner*—Sinh Tran
*Attorney, Agent, or Firm*—Hill, Steadman & Simpson

[57] ABSTRACT

In a hearing aid comprising an input transducer, processing circuits for useful signals including an output stage and an output transducer, the useful signals are sampled with a sampling frequency before the output stage, are converted into data words, and are also processed in discrete-time fashion. The digital data words are capable of being converted into pulse-duration-modulated signals without being reconverted into analog signals. For this purpose, the processed data words can be read into a counting circuit via at least one input which can be placed into an initial condition with counting pulses after every read-in data word. The output stage is designed as a switching amplifier and is driven with an output signal of the counting circuit.

6 Claims, 2 Drawing Sheets

HEARING AID

This is a continuation of application Ser. No. 08/077,669, filed Jun. 17, 1993, now abandoned.

BACKGROUND OF THE INVENTION

The invention is directed to a hearing aid comprising an input transducer, a processing means for useful signals that has an output stage, and an output transducer. The useful signals can be sampled with a sampling frequency before the output stage and can be converted into data words and can also be processed in time-discrete fashion.

DE-AS 27 16 336, incorporated herein, discloses a hearing aid of the type initially cited. An analog-to-digital converter and a circuit for discrete-time processing of the useful signals converted into digital data words are arranged preceding an output stage and following an input transducer (microphone). A sampling frequency is also provided for the discrete-time signal processing. The sampling frequency is selected no lower than twice the upper limit frequency of the useful signals to be processed.

German Patent 36 16 752, incorporated herein, discloses a hearing aid wherein a discrete-time useful signal processing having a pulse-duration modulation is provided in the output stage, this modulation being formed from analog useful signals with the assistance of a delta signal. The output stage is designed as a switching amplifier and is driven with the pulse-duration-modulated signal.

It has been recognized with the invention that, first, a combination of various discrete-time useful signal processing methods in only one hearing aid can be advantageous and that, second, the required expense for the multiple conversion of the useful signals for different discrete-time processing according to methods that differ from one another is relatively high and already leads to space problems in the relatively small hearing aid from the very outset. In particular, it was recognized with the invention that a conversion of the digitally existing data words into a pulse-duration-modulated signal by way of re-conversion into an analog signal, for example with a digital-to-analog converter, and subsequent conversion into a pulse-duration-modulated signal with a delta signal, also involves relatively great circuit-oriented expense.

SUMMARY OF THE INVENTION

It is an object of the invention to design a hearing aid of the type initially cited such that the useful signals coded in digital data words can be advantageously converted into further processable pulse-duration-modulated signals, without re-conversion into analog signals.

According to the invention, a hearing aid is provided having an input transducer, a useful signal processing means connected to the input transducer for sampling useful signals of the sampling frequency and for outputting data words processed in discrete-time fashion. The processed data words are read into a counting circuit that can be placed into an initial condition after every read-in data word with counting pulses. An output stage designed as a switching amplifier is driven with an output signal of the counting circuit.

A critical advantage of the invention is that the useful signals coded in digital data words can be directly converted with a counting circuit into further processable, pulse-duration-modulated signals without re-conversion into analog signals. As a result thereof, the useful signals in the hearing aid can be successively processed according to two discrete-time methods that differ from one another, without requiring a re-conversion of the useful signals into analog signals at an interface between the two methods. A digital-to-analog converter and a circuit for generating a pulse-duration-modulated signal, for example with the assistance of a delta signal that can only be produced in a complicated way, are thereby eliminated.

The counting circuit according to the invention can be realized with less circuit-oriented expense and can be integrated without noteworthy space requirements in an integrated circuit that is regularly provided in the hearing aid.

DESCRIPTION OF THE PREFERRED EMBODIMENTS

Figure 1:
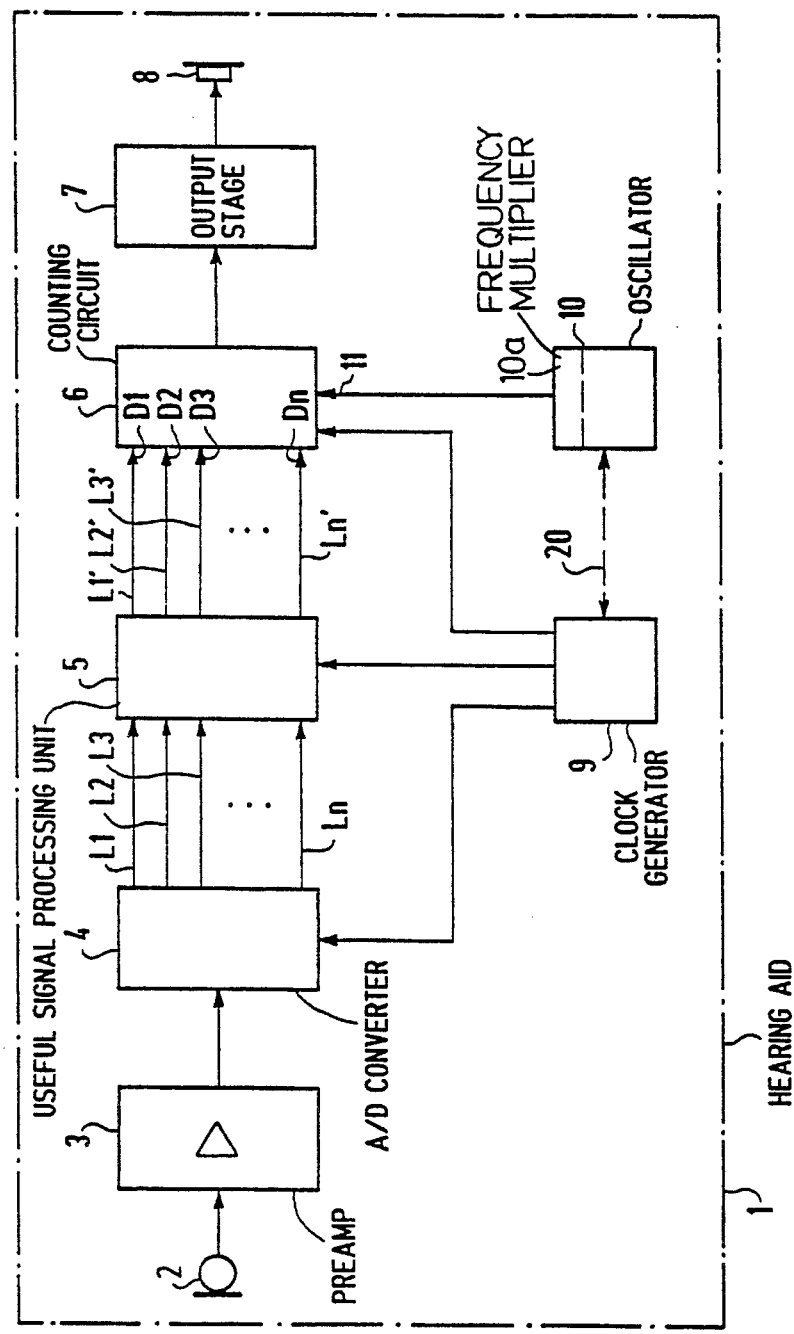
FIG. 1 is a hearing aid for two discrete-time useful signal processing methods that differ from one another, whereby the interface between the two methods is realized with a counting circuit.

In FIG. 1, a dot-dash line symbolically illustrates a hearing aid 1. The hearing aid 1 comprises a microphone 2 as an input transducer that is connected to a processing means for electrical useful signals. The processing means for useful signals in this exemplary embodiment comprises a pre-amplifier 3, an analog-to-digital converter 4, a discrete-time useful signal processing unit 5, a counting circuit 6, and an output stage 7. The output stage 7 is designed as a switching amplifier and is driven with a pulse-duration modulated signal that can be taken from the counting circuit 6. The output stage 7 designed as a switching amplifier thus represents a circuit for a discrete-time signal processing that is different from the discrete-time signal processing in the useful signal processing unit 5. The output stage 7 is connected to an earphone 8 as an output transducer.

Preceding the output stage 7, the electrical useful signals supplied by the microphone are sampled with a sampling frequency in the analog-to-digital converter 4 and are converted into data words. The data words, preferably as pulse-code-modulated useful signals, are supplied via the lines L1 through Ln to the discrete-time useful signal processing unit 5. The processed data words are read into the counting circuit 6 via lines L1' through Ln' and via parallel inputs D1 through Dn. According to one version of the invention, the counting circuit can also be serially loaded with the data words via a serial input (not shown). The counting circuit 6, the useful signal processing unit 5, and the analog-to-digital converter 4 in this exemplary embodiment are clocked with a sampling frequency that can be taken from a clock generator 9. However, it is also possible to design the counting circuit 6 such that clocking with the sampling frequency is not necessary. The counting circuit 6 receives counting pulses from an oscillator 10 that preferably outputs square-wave pulses, receiving these via an input terminal 11. As a result of these counting pulses, the counting circuit 6 is reset into an initial condition (low or high level) after every data word read in via the parallel inputs D1 through Dn.

The chronological duration until the initial condition of the counting circuit 6 occurs is mainly dependent on the binary value of the data word that is respectively read in, and on the pulse repetition rate of the counting circuit. It was also recognized with the invention that the chronological duration until the initial condition of the counting circuit 6 is reached fluctuates, dependent on the binary values of the data words. Since the binary values of the data words are in turn dependent on the amplitude of the electrical useful signals supplied by the microphone 2, the output signal of the counting circuit 6 must also consequently be dependent on the amplitude of the analog, electrical useful signals supplied by the microphone.

As a result of the successive input of data words into the counting circuit, for example in the clock of the sampling frequency, the initial condition of the counting circuit 6 also changes in the clock of this sampling frequency. According to the invention, the duration until the original initial condition of the counting circuit 6 is reached is a measure for the amplitude of the analog, electrical useful signals supplied by the microphone 2. The counting circuit 6, consequently, supplies a pulse-duration-modulated output signal at its output side with which the output stage 7, which is designed as a switching amplifier, can be driven.

In a development of the invention, the counting pulses supplied by the oscillator 10 have a repetition rate that is at least as high as the product of the sampling frequency supplied by the clock generator 9 and the number "2" raised by a maximally allowable bit plurality of data words. When "n" references the maximally allowable bit plurality of data words and "$f_T$" references the sampling frequency "clock frequency", the repetition rate of the counting pulses amounts to $2^n \cdot f_T$.

Figure 1A:
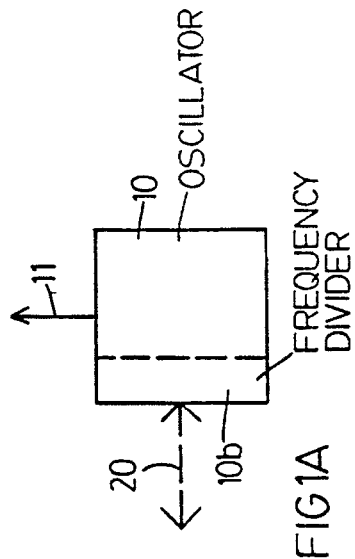
FIG. 1A shows an alternate embodiment for the oscillator 10 in FIG. 1.

The counting pulses can be derived from the sampling frequency by frequency multiplication with frequency multiplier 10a, or the sampling frequency can also be derived from the counting pulses by frequency division with frequency divider 10b shown in the alternate embodiment of FIG. 1A. A synchronization between the sampling frequency of the clock and the pulse repetition rate of the counting pulses can thus be achieved in a simple way. This is indicated by the dashed double arrow 20 between the clock generator 9 and the oscillator 10 in FIG. 1. Consequently, only a shared oscillator is required. The circuit expense and the space requirement are again reduced.

Figure 2:
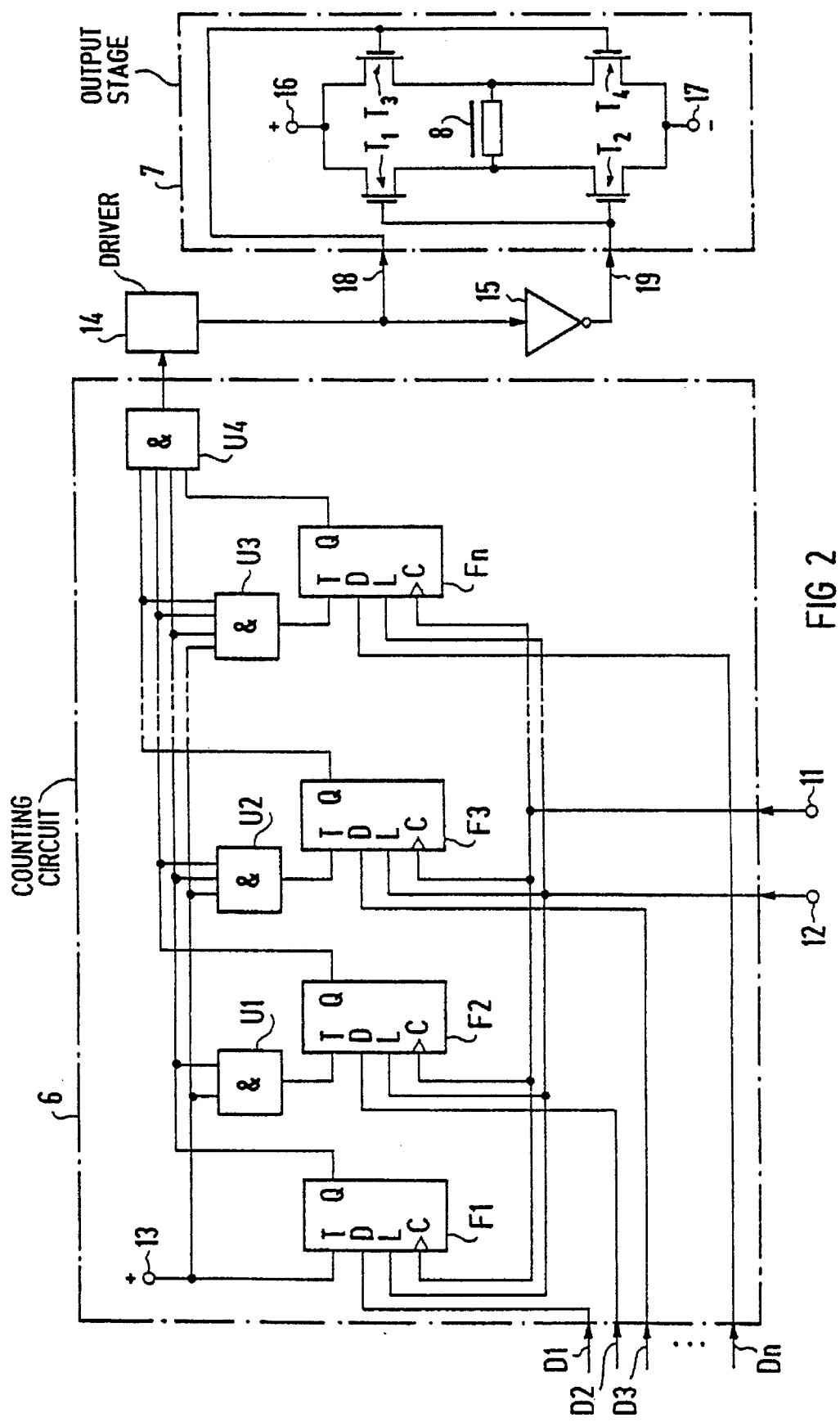
FIG. 2 is a more detailed illustration of a counting circuit with a following output stage according to the hearing aid of FIG. 1.

The counting circuit 6 shown as a block symbol in FIG. 1 is shown in FIG. 2 as a specific counting circuit 6 having the output stage 7 connecting thereto. The counting circuit 6 contains a chain of flip-flop circuits that are designed as binary counters F1 through Fn.

Each of the binary counters F1 through Fn has an input D that is connected to respectively one of the inputs D1 through Dn of the counting circuit 6. Every data word previously processed according to a first discrete-time method is supplied, for example in parallel form, to the counting circuit via these inputs D1 through Dn. The individual bits of each and every data word, therefore, place each of the binary counters F1 through Fn into a switching condition corresponding to the respectively supplied bit. The input of the data words can be controlled (clocked) with the assistance of the sampling frequency via an input 12 at the counting circuit 6. The number of binary counters F1 through Fn (at least) corresponds to the plurality of the maximally allowable bit number of data words that are supplied in parallel via the corresponding plurality of inputs D1 through Dn.

With the binary counters F1 through Fn, the counting circuit 6 is designed as a synchronously counting counter circuit. The counting pulses suppliable via the input 11 of the counting circuit 6 are thereby simultaneously applied to all inputs C at all binary counters F 1 through Fn. So that all flip-flops of the binary counters do not change state at every counting pulse, the binary counters F1 through Fn are designed as toggle flipflops that only change state when a control variable at their inputs is T =1, i.e. has a high potential. A flip-flop in one of the binary counters F1 through Fn can consequently only change state when all lower-value flip-flops are one, i.e. have already changed state. In order to realize this, every output Q of a binary, less-significant counter F1 through F3 is connected via an AND gate U1 through U3 to one of the respective inputs T of the binary counters F2 through Fn. The input T of the binary counter F1 and the AND gates U1 through U3 are connected to a positive potential via a terminal 13, for example the operating voltage of a hearing aid battery.

A further AND gate U4 is provided in the specific counting circuit 6 of FIG. 2. This AND gate U4 has its input side connected to all outputs Q of the binary counters F1 through Fn. Following therefrom is that the AND gate U4 only outputs an output signal (high or low level) when all binary counters F1 through Fn have been reset into the initial condition by the counting pulses supplied via the input 11 of the counting circuit 6.

As a consequence of the successive input of data words into the counting circuit, the output signal output by the AND gate U4 is a pulse-duration-modulated signal. This signal is supplied to the output stage 7, potentially via a driver 14, and is also supplied thereto as a complementary signal via an inverter 15 because of the push-pull design of the output stage 7.

The output stage 7 working as a switching amplifier comprises four MOSFET transistors T1 through T4 working in switched mode in FIG. 2. The transistors T1 and T2 as well as the transistors T3 and T4 are respectively designed complementary relative to one another. The output stage 7 is supplied with operating voltage via terminals 16 and 17. Due to the switched mode, either the transistors T1 and T4 or T3 and T2 are simultaneously transmissive. The time span within which the transistors are transmissive is defined by the respective pulse duration of the individual pulses of the pulse-modulated signal that is supplied to the switching amplifier from the counting circuit 6 via inputs 18 and 19.

Given a change of the level in the pulse-duration-modulated signal, the transistors that are transmissive also change into the non-transmissive condition, and the transistors that were previously non-transmissive thus become transmissive. As a result, the earphone 8 arranged in the bridge arm of the output stage 7 is consequently switched between the operating voltage (plus and minus pole) lying at the terminals 16 and 17. As a result of the low-pass effect of the earphone 8, the analog useful signal is filtered out of the pulse-duration modulated signal and is made audible.

Although various minor changes and modifications might be proposed by those skilled in the art, it will be understood that I wish to include within the claims of the patent warranted hereon all such changes and modifications as reasonably come within my contribution to the art.

I claim as my invention:

1. A hearing aid, comprising:

an input transducer;

means for generating counting pulses;

useful signal processing means connected to the input transducer for sampling useful signals at a sampling frequency and for converting the useful signals into data words processed in discrete-time fashion;

a counting circuit means into which said data words are read via at least one input and which is placed into an initial condition after every read-in data word with said counting pulses;

an output stage designed as a switching amplifier and driven with an output signal of said counting circuit means; and said counting circuit means comprising a chain of flip-flop circuits whose plurality corresponds to a maximum allowable bit plurality of the data words.

2. A hearing aid, comprising:

an input transducer;

means for generating counting pulses;

useful signal processing means connected to the input transducer for sampling useful signals at a sampling frequency and for converting the useful signals into data words processed in discrete-time fashion;

a counting circuit means into which said data words are read via at least one input and which is placed into an initial condition after every read-in data word with said counting pulses;

an output stage designed as a switching amplifier and driven with an output signal of said counting circuit means; and said counting circuit means being formed of a chain of binary counters chained to one another by AND gates such that every binary counter only changes stage when all counters that are binarily less significant have already changed stage so that all binary counters can be simultaneously driven with the counting pulses.

3. A hearing aid, comprising:

an input transducer;

means for generating counting pulses;

useful signal processing means connected to the input transducer for sampling useful signals at a sampling frequency and for converting the useful signals into data words processed in discrete-time fashion;

a counting circuit means into which said words are read via at least one input and which is placed into an initial condition after every read-in data word with said counting pulses, said counting circuit means outputting a pulse duration-modulated output signal; and an output stage means designed as a switching amplifier and driven in pulsed fashion with said pulse duration-modulated output signal of said counting circuit means without conversion to an analog signal and for outputting an amplified pulse-duration modulated hearing aid output signal, an output transducer means connected to said output stage means without an intermediate conversion to an analog signal, said output transducer means providing a low-pass filter effect for converting said amplified pulse duration modulated hearing aid output signal to an analog hearing aid output signal, so that a digital-to-analog converter between said output of said counting circuit and said output transducer means is not required.

4. A hearing aid according to claim 3 wherein said means for generating said counting pulses derives said counting pulses from said sampling frequency by frequency multiplication.

5. A hearing aid according to claim 3 wherein a means for generating said sampling frequency is provided which derives said sampling frequency from said counting pulses by frequency division.

6. A hearing aid, comprising:

an input transducer;

means for generating counting pulses;

useful signal processing means connected to the input transducer for sampling useful signals at a sampling frequency and for converting the useful signals into data words processed in discrete-time fashion;

a counting circuit means into which said data words are read via at least one input and which is placed into an initial condition after every read-in data word with said counting pulses;

an output stage designed as a switching amplifier and driven with an output signal of said counting circuit means; and said means for generating said counting pulses providing said counting pulses with a repetition rate that is at least as high as a product of said sampling frequency and a number "2", raised by a maximum allowable bit plurality of the data words.

* * * * *